(12) United States Patent
Tatsuda et al.

(10) Patent No.: US 7,938,603 B2
(45) Date of Patent: May 10, 2011

(54) SPINDLE HEAD FOR MACHINE TOOL

(75) Inventors: Yoshinori Tatsuda, Ishikawa-Ken (JP);
Yoichi Nishita, Ishikawa-Ken (JP)

(73) Assignee: Tsudakoma Kogyo Kabushiki Kaisha,
Ishikawa-Ken (JP)

( * ) Notice: Subject to any disclaimer, the term of this patent is extended or adjusted under 35 U.S.C. 154(b) by 0 days.

(21) Appl. No.: 12/865,588

(22) PCT Filed: Jan. 26, 2009

(86) PCT No.: PCT/JP2009/051161
§ 371 (c)(1),
(2), (4) Date: Jul. 30, 2010

(87) PCT Pub. No.: WO2009/098957
PCT Pub. Date: Aug. 13, 2009

(65) Prior Publication Data
US 2010/0322734 A1    Dec. 23, 2010

(30) Foreign Application Priority Data
Feb. 8, 2008   (JP) ................. 2008-028909

(51) Int. Cl.
*B23C 1/12*   (2006.01)
(52) U.S. Cl. ....................... 409/216; 408/236
(58) Field of Classification Search ........... 409/201, 409/216, 211, 231–232, 144, 230, 135–136; 408/236, 56
See application file for complete search history.

(56) References Cited

U.S. PATENT DOCUMENTS

| 5,584,621 | A | * | 12/1996 | Bertsche et al. | 409/201 |
| 6,746,188 | B2 | * | 6/2004 | Watanabe | 409/201 |
| 7,293,340 | B1 | * | 11/2007 | Tsao et al. | 409/216 |
| 2009/0162160 | A1 | * | 6/2009 | Lechleiter et al. | 409/201 |
| 2010/0028094 | A1 | * | 2/2010 | Yoneyama et al. | 408/56 |
| 2010/0034610 | A1 | * | 2/2010 | Yoneyama et al. | 409/231 |

FOREIGN PATENT DOCUMENTS

| JP | 63-156632 A | 6/1988 |
| JP | 2003-48135 A | 2/2003 |
| JP | 2003-170326 A | 6/2003 |
| WO | WO-2008078454 A1 * | 7/2008 |
| WO | WO-2008078455 A1 * | 7/2008 |

OTHER PUBLICATIONS

International Search Report mailed on Apr. 7, 2009 for corresponding International Publication No. WO 2009/098957.

* cited by examiner

*Primary Examiner* — Erica E Cadugan
(74) *Attorney, Agent, or Firm* — Knoble Yoshida & Dunleavy, LLC

(57) ABSTRACT

A support shaft of a spindle unit having a through hole in which wires are laid has a structure that can obtain much spatial room so as to prevent a break in cables and to be compatible with a high-output spindle motor. A machine-tool spindle head 1 includes a support head 6 that drives a spindle unit 4 for indexing around a turn axis (A-axis) of the spindle unit 4 by rotatably supporting a pair of support shafts 9 coupled to the spindle unit 4 on the A-axis by a pair of fork arms 7 and bearings 13. The pair of support shafts 9 have through holes 12 in which a plurality of wires 22 extending from the spindle unit 4 are laid, the plurality of wires 22 are divided into two wire groups, and the wire groups are separately laid in the pair of support shafts 9.

4 Claims, 4 Drawing Sheets

SPINDLE HEAD FOR MACHINE TOOL

TECHNICAL FIELD

The present invention relates to a spindle head for a machine tool, and more particularly relates to a structure for supplying electric power and fluid to a spindle unit.

BACKGROUND ART

Patent Document 1 discloses a spindle head including a fork-shaped driving portion (A-axis driving portion) that supports a spindle unit for rotating a spindle, to which a tool is attached, and that turns the spindle unit in a machine tool such as a so-called machining center.

The spindle unit rotates the spindle, which is rotatably supported in a housing of the spindle unit, by an internal spindle motor (also referred to as a built-in motor). A power line for supplying driving current is connected to the spindle motor, and this power line is led out from the housing of the spindle unit and is laid towards a power supply circuit in the machine tool.

In general, the power line is laid through the housing of the support head for supporting the spindle unit so as not to obstruct the turn of the spindle unit. For wiring from the spindle unit to the support head, the power line is sometimes led outside from a rear end portion (rear end face) of the spindle unit and is then led into the support head again. Sometimes a through hole is formed in a support shaft provided in the support head so as to support the spindle unit, and the power line is laid through the support shaft in a manner such as not to be exposed outside. In the conventional typical spindle head, when the power line is laid through the support shaft, as described above, only one of the support shafts on both sides of the spindle unit is capable of routing, and the power line extends from only one side of the spindle unit.

When the output of the spindle motor is increased to enhance productivity, the power line is thickened correspondingly. Further, when the spindle motor is of a coil switching type including a coil for high-speed rotation and a coil for low-speed rotation in order to drive the spindle at two speeds, that is, a low speed and a high speed, the number of power lines is doubled (for example, three power lines corresponding to U, B, and W phases of a three phase motor are doubled to six power lines).

In the routing path in the support shaft, not only the power line for the spindle motor, but also a signal line from a sensor (temperature sensor, rotation sensor for the motor) provided in the spindle unit is sometimes laid. Further, a pipe for supplying working fluid to the spindle unit is sometimes provided. Examples of this working fluid are air to be injected from near an end of the spindle towards the workpiece in order to prevent cutting chips produced during cutting from entering the spindle unit, cooling fluid for cooling the spindle motor, and coolant liquid for working.

In this way, not only a plurality of cables, such as power lines and signal lines, but also pipes for fluid supply are sometimes laid in the support shaft. When a plurality of cables and pipes are passed through the support shaft, there is no spatial room in the through hole of the support shaft, and a break may be caused by twisting and rubbing of the cables with the rotation of the support shaft. Further, since there is no spatial room, it may be impossible to pass a thicker power line and to be compatible with a high-output spindle motor. In the case of the power line, the bulk ratio of the space where the power line is passed is specified in design, and the power line cannot be passed through the space having little room.

Patent Document 1: U.S. Pat. No. 5,584,621

DISCLOSURE OF INVENTION

Problems to be Solved by the Invention

Accordingly, an object of the present invention is to obtain, in a spindle head in which a plurality of power and signal lines and a pipe for fluid supply (hereinafter referred to as "wires") for a spindle unit are provided in a support shaft, much spatial room in a routing path in the support shaft of the spindle unit in a state in which the lines are passed through the routing path so as to prevent a break in the laid cables and so as to assemble a high-output spindle motor in the spindle unit.

Means for Solving the Problems

For the above object, the present invention provides a spindle head (1) for a machine tool, including a spindle unit (4) configured to rotate, by an incorporated spindle motor (5), a spindle (3) having an end to which a tool (2) is attached; and a support head (6) configured to support the spindle unit (4) and including a pair of fork arms (7) spaced in a direction of a turn axis (A-axis) of the spindle unit (4) and a pair of support shafts (9, 30, 31) turnably supported by bearings (13) in the fork arms (7) and coupled to the spindle unit (4). The support shafts (9, 30, 31) have through holes (12) in which a plurality of wires (22) extending from the spindle unit (4) are laid, the plurality of wires (22) are divided into two wire groups, and the wire groups are separately laid in the pair of support shafts (9, 30, 31).

In the present invention, the plurality of wires (22) may include a power line (22a) for supplying driving current to the spindle motor (5) and a signal line (22b) for outputting a signal from a sensor provided in the spindle unit (4), and the power line (22a) and the signal line (22b) are separately laid in the wire groups.

Further, in the present invention, the support head (6) may include as components in the fork arms (7), driving motors (14) for rotating the support shafts (9) and clamp means (28) for holding turn positions of the support shafts (9), in addition to the support shafts (9) and the bearings (13). Structures in the pair of fork arms (7) including the components may be line-symmetrical with respect to a rotation axis (C-axis) of the spindle (3) in the spindle unit (4).

ADVANTAGES

According to the present invention, in the above-described machine-tool spindle head (1), the through holes (12) through which a plurality of wires (22) (e.g., a power line for the spindle motor and a signal line for the sensor) extending from the spindle unit (4) are laid are provided in the plurality of support shafts (9, 30, 31), and the plurality of wires (22) are divided into two wire groups, and the wire groups are separately laid in the pair of support shafts (9, 30, 31). Therefore, there is larger spatial room in the wiring paths of the support shafts than when the plurality of wires (22) extending from the spindle unit (4) are passed and laid in one of the support shafts, and this can minimize the occurrence of a break in the wires laid in the support shafts due to twisting and rubbing with the rotation of the support shafts. Moreover, since there is large spatial room in the routing path, a thicker power line can be inserted, and a higher-output spindle motor can be adopted in the spindle head.

Further, the power line (22a) for supplying driving current to the spindle motor (5) and the signal line (22b) for outputting the signal from the sensor provided in the spindle unit, which are included in the plurality of wires (22), are separately laid in the different wire groups. With this, it is possible to prevent noise produced from the power line from adversely affecting the signal line and to thereby obtain an accurate detection value.

In addition, the following advantage can be expected by making the structures in the fork arms (7) line-symmetrical with respect to the rotation axis (C-axis) of the spindle (3) in the spindle unit (4).

That is, the driving motor generates heat with driving of the support head, and the heat sometimes causes thermal displacement of the structure including the components around the driving motor. In this case, if there is a difference between the structures in the fork arms including the support shafts for supporting the spindle unit on the right and left sides in the direction of the turn axis (A-axis), the structural state change due to the thermal displacement is different between the fork arms. With this, the spindle unit supported on both sides by the support shafts in the fork arms sometimes tilts, the axis of the spindle deviates to the right or left, and working accuracy decreases. In contrast, when the structures in the fork arms, especially the structures including the main components are symmetrical, the structural state change due to the thermal displacement is the same between the fork arms, and it is therefore possible to prevent the above-described deviation of the axis of the spindle.

Figure 1:
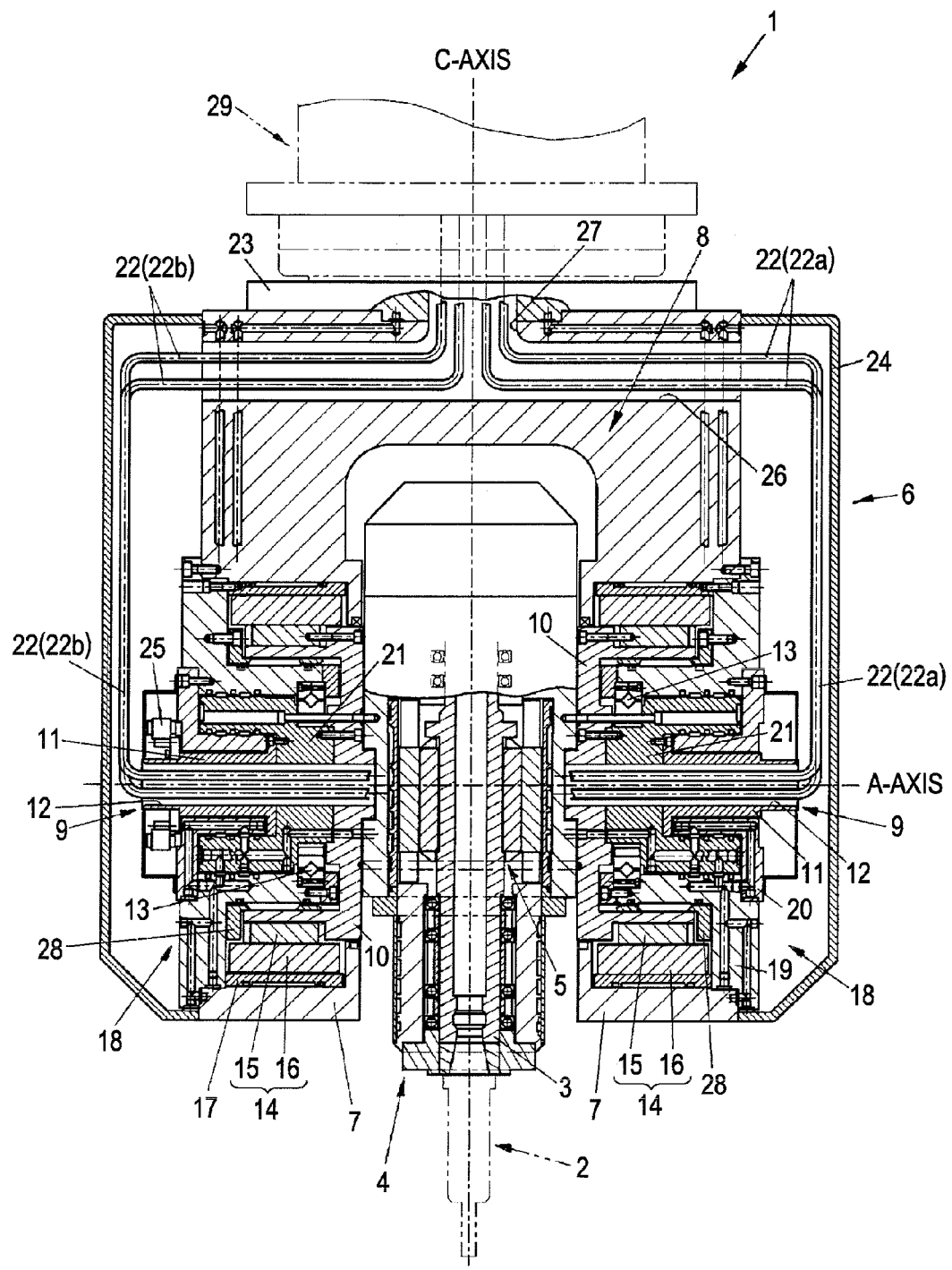
FIG. 1 is a cross-sectional view of a machine-tool spindle head 1 according to the present invention.

REFERENCE NUMERALS 1 machine-tool spindle head
2 tool
3 spindle
4 spindle unit
5 spindle motor
6 first support head
7 fork arm
8 housing
9 support shaft
10 turn wheel
11 turn sleeve
12 through hole
13 bearing
14 driving motor
15 motor rotor
16 motor stator
17 stator sleeve
18 rotary joint
19 distributor
20 distributor
21 shaft
22 line
22a power line
22b signal line
23 mount base portion
24 cover
25 rotation detector
26 cable insertion hole
27 cable insertion hole
28 clamp means
29 second support head
30 support shaft
31 support shaft
33 rotary joint
34 distributor
34a through hole
35 shaft
36 rotary joint
37 distributor
37a through hole
38 shaft
40 machine tool
41 bed
42 column
43 cross rail
44 saddle
45 ram
46 table

BEST MODES FOR CARRYING OUT THE INVENTION

A spindle head to which the present invention is directed is used in a machine tool such as a vertical machining center (multitask machine). A description will be given below of an embodiment in which the present invention is applied to a vertical machining center.

Figure 2:
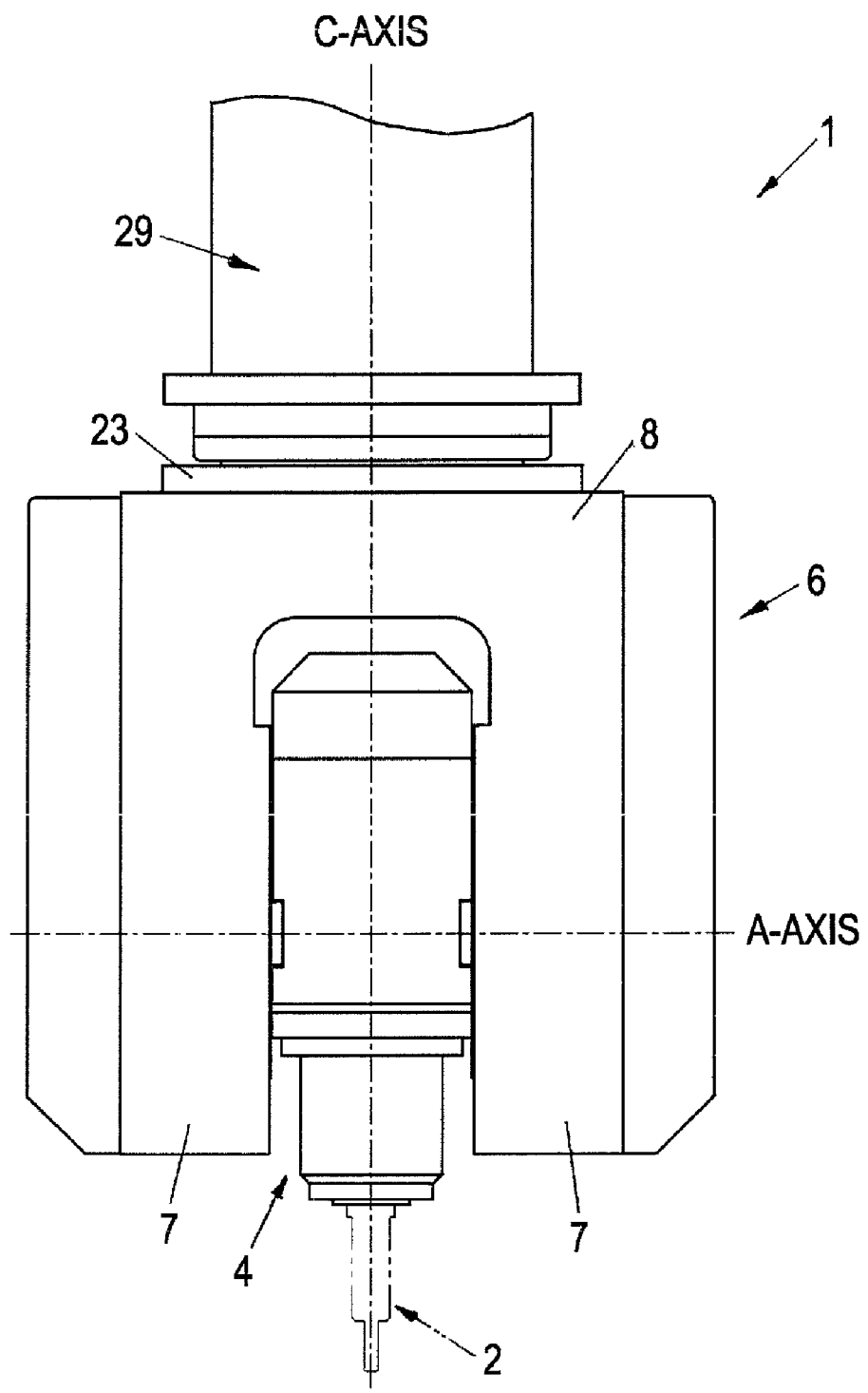
FIG. 2 is a front view of the machine-tool spindle head 1 of the present invention.

FIGS. 1 and 2 illustrate a machine-tool spindle head 1 according to the present invention. The machine-tool spindle head 1 refers to a device that is used in a vertical machining center or the like and that supports and turns a spindle unit 4 to which a tool 2 is attached. Here, when the machine-tool spindle head 1 is mounted in a vertical machining center or the like, it entirely moves in the X-, Y-, and Z-directions of the machine tool, and the spindle unit 4 supported by the machine-tool spindle head 1 rotates on an axis (A-axis) parallel to the X-Y plane and on an axis (C-axis) parallel to the Z-axis.

The machine-tool spindle head 1 includes a spindle 3 having an end to which a tool 2 is attached, the spindle unit 4 for rotating the spindle, a first support head (A-axis driving portion) 6 for supporting the spindle unit 4 turnably on the A-axis, and a second support head (C-axis driving portion) 29 for supporting the spindle unit 4 and the first support head 6 rotatably on the C-axis. The machine-tool spindle head 1 machines a workpiece into a component having a complicated shape at high efficiency and high accuracy while pointing the tool 2 in the most suitable direction for the workpiece. The spindle unit 4 is of a built-in motor type incorporating a spindle motor 5, and rotates the spindle 3 by the spindle motor 5. During cutting, a tool 2 adapted for cutting is attached to the end of the spindle 3, and a workpiece is cut by the rotation of the spindle 3, that is, the tool 2.

The first support head 6 is of a double-sided motor type in which a fork-shaped housing 8 serves as a frame and driving motors 14 are provided in a pair of fork arms 7 spaced in a direction of a turn axis (A-axis) of the spindle unit 4.

A pair of fork arms 7 have internal structures line-symmetrical with respect to a rotation axis (C-axis) of the spindle 3. Each of the fork arms 7 includes a support shaft 9 coupled to the spindle unit 4, a bearing 13 for supporting the support shaft 9 turnably, a DD motor serving as a driving motor 14 for driving the spindle unit 4 for indexing around the A-axis, a rotary joint 18 for supplying fluid to the spindle unit 4, and a clamp sleeve serving as a clamp means 28 for clamping the support shaft 9 so as to fix the spindle unit 4 at a desired indexing angle. In FIG. 1, only the left fork arm 7 is provided with a rotation detector (encoder) 25 for detecting the rotation angle of the support shaft 9. Structures other than the rotation detector 25 are all line-symmetrical with respect to the C-axis.

The driving motor 14 directly drives the support shaft 9 not via a driving transmission mechanism such as a gear, and is also called a direct (direct driving type) driving motor. The driving motor 14 includes a motor rotor 15 and a motor stator 16. The motor rotor 15 is fixed to a turn wheel 10 that forms a part of the support shaft 9, and the motor stator 16 is fitted in a stator sleeve 17 fixed to the fork arm 7 in a manner such as not to rotate.

The rotary joint 18 supplies working fluid from a side of the first support head 6 to the turning spindle unit 4, and includes distributors 19 and 20 fixed to the fork arm 7 and a shaft 21 that forms a part of the support shaft 9 and turns together with the support shaft 9. Here, examples of working fluid are coolant liquid and water for cooling, and air for removing cutting chips or the like produced during machining.

The support shaft 9 includes the turn wheel 10 and the shaft 21 described above and a turn sleeve 11. One of both ends of the support shaft 9 is coupled to the spindle unit 4, and the other end is exposed from an outer side face of the fork arm 7. The members, that is, the turn wheel 10, the shaft 21, and the turn sleeve 11 have holes of the same diameter in the centers thereof. These holes define a through hole 12, through which the support shaft 9 extends along the axial direction, in a state in which the members are combined. That is, the through hole 12 extends from an outer side of the housing 8 (fork arm 7) of the first support head 6 to the spindle unit 4 through the interior of the first support head 6.

In the through hole 12, a plurality of wires 22 extending from the spindle unit 4 are laid. The term "wire" is a concept including not only an electrical cable such as a power line and a signal line, but also a pipe for fluid supply and the like, as defined above. FIG. 1 illustrates an example in which power lines 22a and signal lines 22b of the spindle unit 4 are laid. However, the lines are partially omitted in the figure.

As described above, a pair of fork arms 7 have internal structures line-symmetrical with respect to the C-axis, and the through hole 12 is provided on each side of the spindle unit 4. With this, a plurality of wires 22 can be divided into two wire groups according to the application, size, etc. of the wires 22, and the wire groups can be respectively laid in the through holes 12 of the pair of support shafts 9. For example, in the embodiment, the power lines 22a and the signal lines 22 are respectively laid in the through holes 12 of the different support shafts 9 in consideration of the influence of noise generated from the power lines 22a on the signal lines 22b (however, when the used signal lines 22b are insusceptible to noise, the power lines 22a and the signal lines 22b may be mixed in each wire group because there is no problem even when the lines are laid in the same support shaft 9).

While the wires 22 laid in the through holes 12 of the support shafts 9 are electrical cables such as the power lines of the spindle motor 5 in the spindle unit 4 and the signal lines from the sensor in this embodiment, the wires 22 are not limited to such electrical wires, and may include fluid supply pipes (supply pipes) for supplying the above-described working fluid. That is, while the above-described working fluid is supplied from a fluid channel provided in, for example, the housing 8 of the first support head 6 to the spindle unit 4 through the rotary joints 18 in this embodiment, part of the working fluid is sometimes supplied to the spindle unit 4 through a special supply pipe or the like not via the rotary joints, depending on the specifications of the spindle unit 4. Such a supply pipe may be laid together with the above-described cables in the through holes 12.

Since the through holes 12 serving as routing paths for the wires 22 are thus provided on either side of the spindle unit 4, one, or two or more wires 22 of various types can be divided into two wire groups according to the application and size, and the wire groups can be distributed in the pair of through holes 12.

For example, instead of separating the power lines 22a and the signal lines 22b into different wire groups and distributing the wire groups in the through holes 12 of the different support shafts 9, as described above, when the wires 22 include electrical cables and a fluid supply pipe, the electrical cables and the fluid supply pipe may be laid separately. That is, when only the electrical cables are laid in the through hole 12 of one of the support shafts 9 and only the fluid supply pipe is laid in the through hole 12 of the other support shaft 9, electrical leakage and a short circuit due to water leakage can be prevented. Further, by subjecting the through holes 12 to shielding and sealing, such as magnetic shielding, nonconductive treatment, heat protection, and heat insulation, according to the types of the wires 22 to be laid, the above-described effects can be enhanced further.

In the illustrated spindle head 6, the rotary joint 18 is provided in each fork arm 7. When inserting the cables or the like in the support shaft in this spindle head having the rotary joint, in order to maximize the spatial room in the through hole of the support shaft, it is conceivable, as a typical solving means, to increase the diameter of the support shaft within a designable range. However, if the diameter of the support shaft increases, the diameter of the rotary joint surrounding the support shaft increases inevitably. Since the distributor and the shaft in the rotary joint rotate relative to each other with their fitting surfaces in sliding contact and a seal member is interposed between the distributor and the shaft, the slide resistance is relatively higher than when the distributor and the shaft are simply in contact with each other. The slide resistance therebetween is proportional to the area of the sliding surface, and the area is proportional to the diameter of the sliding surface. Hence, the slide resistance increases as the diameter of the rotary joint increases. Therefore, to limit power loss of the driving motor, it is preferable that the diameter of the rotary joint should be small, and for that purpose, it is preferable that the diameter of the support shaft should also be small. In this way, the typical solving means does not meet contradictory demands to increase the spatial room in the support shaft and not to increase the diameter (of the slide surface) of the rotary joint.

In contrast, according to the present invention, the through holes 12 are provided in both of the support shafts 9 for supporting the spindle unit 4, and a plurality of cables or the like are distributed in the support shafts 9. Hence, the spatial room in the support shafts can be made larger than in the related art without increasing the diameter of the support shafts 9, and the slide resistances of the sliding surfaces in the rotary joints 18 can be prevented from increasing, while ensuring spatial room in the support shafts 9.

The first support head 6 and the second support head 29 are connected at a mount base portion 23 of the first support head 6. As will be described below with reference to FIG. 3, the second support head 29 is held by a machine tool such as a machining center. Although not shown, the second support head 29 incorporates a driving motor, such as a DD motor, therein, and rotates the first support head 6 on the C-axis (axis parallel to the Z-axis of the machining center). In a standby state of the spindle 3, the C-axis coincides with the center axis of the spindle 3.

In the illustrated embodiment, the cables (power lines 22a and signal lines 22b) serving as the wires 22 pass through the through holes 12 in the support shafts 9, pass through the space provided between the housing 8 and a cover member 24 in the first support head 6, are inserted into a cable insertion hole 26 provided in the housing 8 from an upper side face of the housing 8, extend out from a cable insertion hole 27 centered on the C-axis and opened at the top of the first support head 6, and are led into the second support head 29. Although not shown, in the second support head 29, the wires 22 pass through a through hole provided in a rotation shaft to be rotated on the C-axis, and are led out towards a machine tool 40.

Figure 3:
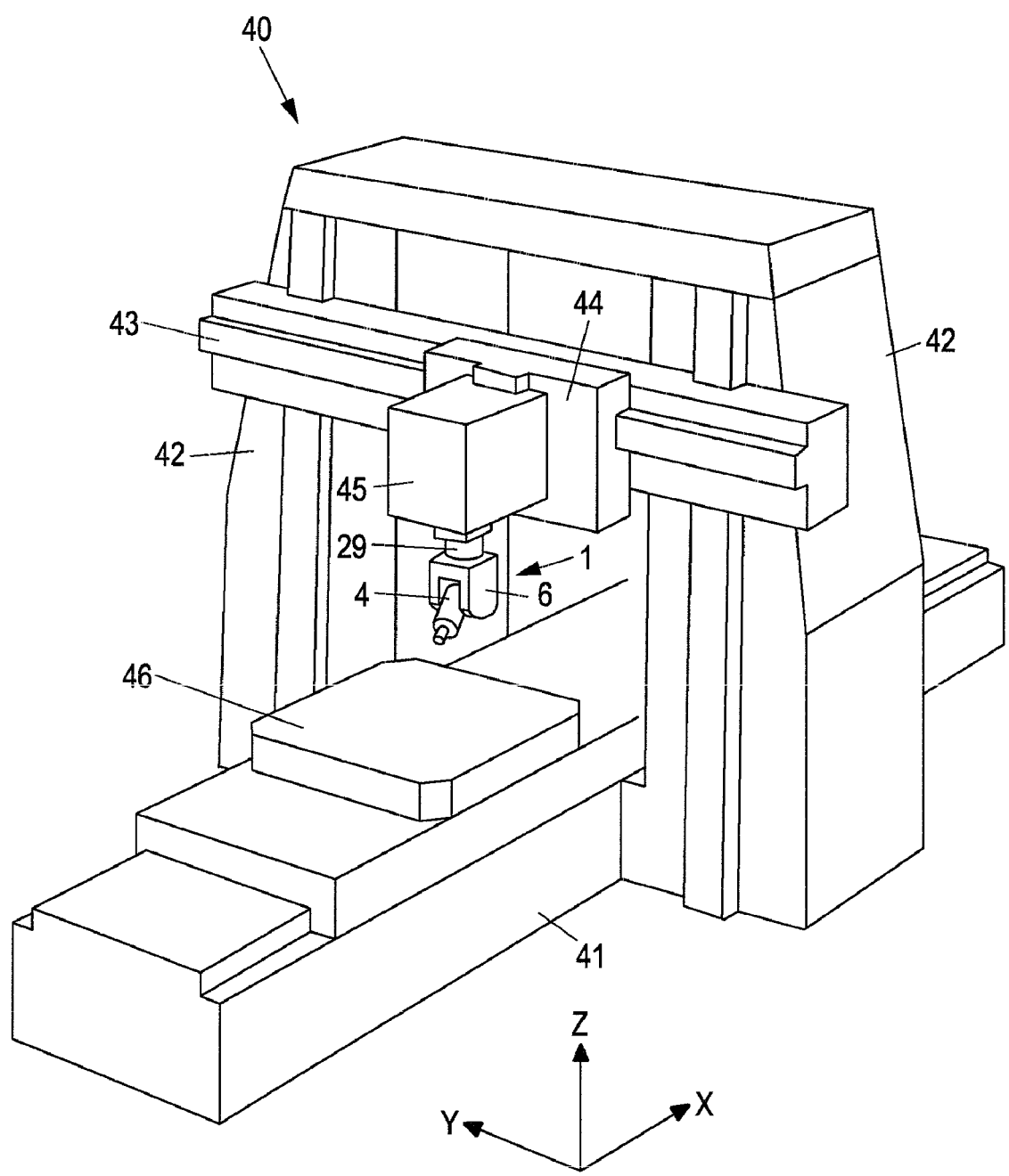
FIG. 3 is a schematic view of a machine tool in which the machine-tool spindle head 1 is assembled.

Referring to FIG. 3, a brief description will be given of an example of a machine tool in which the machine-tool spindle head 1 of the present invention is assembled. A machine tool 40 is a vertical machining center, and includes a pair of right and left columns 42 attached onto a bed 41, a horizontal cross rail 43 that moves on the pair of columns 42 in an up-down direction (Z-axis direction), a saddle 44 that horizontally moves in a right-left direction (Y-axis direction) on the cross rail 43, a ram 45 that moves on the saddle 44 in the Z-axis direction, and a table 46 that horizontally moves on the bed 41 in a front-rear direction (X-axis direction). The machine-tool spindle head 1 of the present invention is supported with the second support head 29 being inserted in the ram 45 and fixed to the ram 45.

Figure 4:
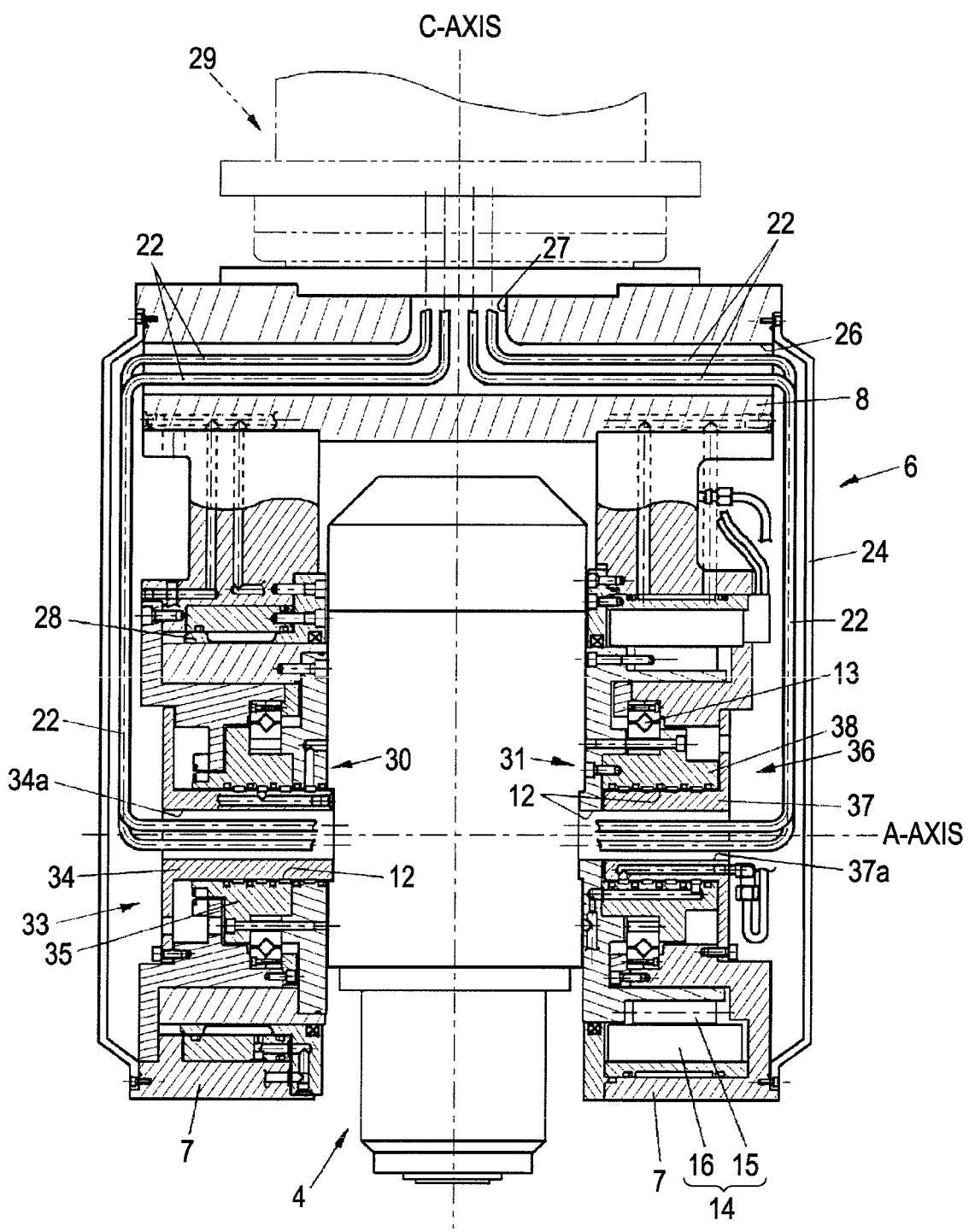
FIG. 4 is a cross-sectional view of a machine-tool spindle head 1 according to another embodiment of the present invention.

FIG. 4 illustrates another embodiment of the present invention. This embodiment is greatly different from the above-described embodiment in that structures in fork arms 7 are not symmetrical. A machine-tool spindle head 1 is used in a vertical machining center (multitask machine) or the like, similarly to the first embodiment.

The machine-tool spindle head 1 of this embodiment includes, as main components, a spindle unit 4, a first support head 6, and a second support head 29, similarly to the above-described embodiment.

The first support head 6 includes support shafts 30 and 31, a driving motor 14, rotary joints 33 and 36, and a clamp means 28. However, unlike the above-described embodiment, structures in the fork arms 7 are not line-symmetrical with respect to the C-axis. That is, in this embodiment, the driving motor 14 for driving is provided in only one of the fork arms 7, and the clamp sleeve 28 is provided only in the other fork arm 7. The rotary joints 33 and 36 are provided in the corresponding fork arms 7, and include distributors 34 and 37 and shafts 35 and 38.

In this embodiment, through holes 12 through which wires 22 extending from the spindle unit 4 are laid are also provided in a pair of support shafts 30 and 31. While the wires 22 are directly laid in the through holes 12 provided in the support shafts in the above-described embodiment, the distributors 34 and 37 are inserted in the through holes 12 provided in the support shafts 30 and 31 in this embodiment, and the wires 22 are laid in through holes 34a and 37a provided in the distributors 34 and 37.

In this way, depending on the structures and arrangements of the driving motor, the support shaft, and the rotary joint in the first support head 6, the wires 22 are sometimes directly laid in the through holes 12 provided in the support shafts 9, as in the embodiment shown in FIG. 1, and are sometimes indirectly laid in the through holes 12 of the support shafts 30 and 31 with other members being disposed therebetween, as in the embodiment shown in FIG. 4. In the latter case, when the other members are prohibited from turning (for example, the distributors 34 and 37 in the embodiment shown in FIG. 4 do not turn because they are fixed to the housings 8 of the fork arms 7), since the wires 22 extending therethrough and the other members do not move relative to each other, it is possible to prevent trouble, for example, a break in the wires 22 due to rubbing against the other members.

In the illustrated embodiment, the wires 22 pass through the through holes 12 (34a, 37a) in the support shafts 30 and 31, pass through the space between the housing 8 and a cover member 24 in the first support head 6, are inserted into a cable insertion hole 26 provided in the housing 8 from an upper side face of the housing 8, extend from a cable insertion hole 27 centered on the C-axis and opened at the top of the first support head, and are led into the second support head 29. Although not shown, in the second support head 29, the wires 22 pass through a through hole provided in a rotation shaft to be rotated on the C-axis, and are then led out towards a machine tool 40.

The invention claimed is:

1. A spindle head (1) for a machine tool, comprising:
   a spindle unit (4) configured to rotate, by an incorporated spindle motor (5), a spindle (3) having an end to which a tool (2) is attached; and
   a support head (6) configured to support the spindle unit (4) and including a pair of fork arms (7) spaced in a direction of a turn axis (A-axis) of the spindle unit (4) and a pair of support shafts (9, 30, 31) turnably supported by bearings (13) in the fork arms (7) and coupled to the spindle unit (4),
   wherein the support shafts (9, 30, 31) have through holes (12) in which a plurality of wires (22) extending from the spindle unit (4) are laid, and
   wherein the plurality of wires (22) are divided into two wire groups, and the wire groups are separately laid in the pair of support shafts (9, 30, 31).

2. The spindle head (1) for the machine tool according to claim 1,
   wherein the plurality of wires (22) include a power line (22a) for supplying driving current to the spindle motor (5) and a signal line (22b) for outputting a signal from a sensor provided in the spindle unit (4), and
   wherein the power line (22a) and the signal line (22b) are separately laid in the different wire groups.

3. The spindle head (1) for the machine tool according to claim 1,
   wherein, in the fork arms (7), driving motors (14) for rotating the support shafts (9) and clamp means (28) for holding turn positions of the support shafts (9) are provided as components of the fork arms (7) in addition to the support shafts (9) and the bearings (13), and
   wherein structures in the pair of fork arms (7) including the components are line-symmetrical with respect to a rotation axis (C-axis) of the spindle (3) in the spindle unit (4).

4. The spindle head (1) for the machine tool according to claim 2, wherein, in the fork arms (7), driving motors (14) for rotating the support shafts (9) and clamp means (28) for holding turn positions of the support shafts (9) are provided as components of the fork arms (7) in addition to the support shafts (9) and the bearings (13), and wherein structures in the pair of fork arms (7) including the components are line-symmetrical with respect to a rotation axis (C-axis) of the spindle (3) in the spindle unit (4).

* * * * *